US011859478B2

(12) United States Patent
Ye et al.

(10) Patent No.: US 11,859,478 B2
(45) Date of Patent: Jan. 2, 2024

(54) CALCIUM CARBONATE / FIBER ADDITIVES FOR USE IN SUBTERRANEAN OPERATIONS

(71) Applicant: Halliburton Energy Services, Inc., Houston, TX (US)

(72) Inventors: Xiangnan Ye, Cypress, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 607 days.

(21) Appl. No.: 16/605,446

(22) PCT Filed: Dec. 7, 2018

(86) PCT No.: PCT/US2018/064403
§ 371 (c)(1),
(2) Date: Oct. 15, 2019

(87) PCT Pub. No.: WO2020/117261
PCT Pub. Date: Jun. 11, 2020

(65) Prior Publication Data
US 2021/0108493 A1 Apr. 15, 2021

(51) Int. Cl.
*C09K 8/516* (2006.01)
*E21B 43/25* (2006.01)
*C09K 8/508* (2006.01)

(52) U.S. Cl.
CPC ............ *E21B 43/25* (2013.01); *C09K 8/5083* (2013.01); *C09K 8/5086* (2013.01); *C09K 8/516* (2013.01); *C09K 2208/08* (2013.01)

(58) Field of Classification Search
CPC . C09K 8/032; C09K 8/22; C09K 8/24; C09K 8/487; C09K 8/516; C09K 8/845; C09K 8/92; C09K 2208/08
See application file for complete search history.

(56) References Cited

U.S. PATENT DOCUMENTS

| 2012/0202718 A1 | 8/2012 | Ballard et al. |
| 2014/0041870 A1 | 2/2014 | Sanders et al. |
| 2014/0209386 A1 | 7/2014 | Jamison et al. |

(Continued)

FOREIGN PATENT DOCUMENTS

WO 2017/078712 A1 5/2017

OTHER PUBLICATIONS

International Preliminary Report on Patentability issued in related PCT Application No. PCT/US2018/064403 dated Jun. 17, 2021, 8 pages.

(Continued)

*Primary Examiner* — Aiqun Li
(74) *Attorney, Agent, or Firm* — Thomas Rooney; C. Tumey Law Group PLLC

(57) ABSTRACT

Fiber additives that may be useful as lost circulation materials for mitigating fluid loss and/or as bridging agents or diverting agents in subterranean treatment fluids such as drilling fluids. In some embodiments, the fiber additives include a fiber and calcium carbonate disposed on at least a portion of the outer surface of the fiber. In some embodiments, the methods include providing a treatment fluid that includes the base fluid and the fiber additives, and introducing the treatment fluid into at least a portion of a subterranean formation.

17 Claims, 2 Drawing Sheets

(56) References Cited

U.S. PATENT DOCUMENTS

| | | |
|---|---|---|
| 2015/0126415 A1 | 5/2015 | Husein et al. |
| 2015/0159076 A1* | 6/2015 | Arias Prada ............ E21B 43/16 |
| | | 166/305.1 |
| 2016/0060501 A1 | 3/2016 | Kefi et al. |
| 2018/0022980 A1* | 1/2018 | Leidinger ........... C04B 16/0641 |
| | | 166/292 |
| 2018/0163504 A1* | 6/2018 | Watson .................. E21B 23/00 |

OTHER PUBLICATIONS

International Search Report and Written Opinion issued in related PCT Application No. PCT/US2018/064403 dated Sep. 5, 2019, 15 pages.

* cited by examiner

US 11,859,478 B2

CALCIUM CARBONATE / FIBER ADDITIVES FOR USE IN SUBTERRANEAN OPERATIONS

CROSS-REFERENCE TO RELATED APPLICATION

The present application is a U.S. National Stage Application of International Application No. PCT/US2018/064403 filed Dec. 7, 2018, which is incorporated herein by reference in its entirety for all purposes.

BACKGROUND

The present disclosure relates to systems and methods for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, well drilling, completion, and stimulation operations. Examples of such treatment fluids include, among others, drilling fluids, well cleanup fluids, workover fluids, conformance fluids, gravel pack fluids, acidizing fluids, fracturing fluids, spacer fluids, and the like.

While drilling a wellbore penetrating a subterranean formation, portions of the drilling fluid being circulated through the wellbore may be lost into the surrounding formation. Fluids are typically lost into the formation through fractures induced by excessive mud pressures, pre-existing open fractures, or large openings with structural strength in the formation. In addition to underground blow-outs, cross flow, and loss of hydrostatic pressure, lost circulation can lead to a drill pipe becoming lodged in the wellbore. In some instances, drilling may be terminated to allow for a remedial operation to be performed.

In some drilling operations when lost circulation is observed, the wellbore may be treated with lost circulation materials ("LCM") for plugging the portion of the formation through which the fluids are being lost. A variety of LCMs have been used or proposed for arresting lost circulation of drilling fluids, including fiber LCMs due to their mechanical strength, toughness, and flexibility. However, these materials do not always interact with the base fluid and/or with each other to provide the desired fluid loss control. For example, shear forces acting on the LCMs can sometimes prevent the LCMs from dispersing well throughout the base fluid and providing an appropriate plug in loss zones.

BRIEF DESCRIPTION OF THE DRAWINGS

These drawings illustrate certain aspects of some of the embodiments of the present disclosure, and should not be used to limit or define the claims.

Figure 1:
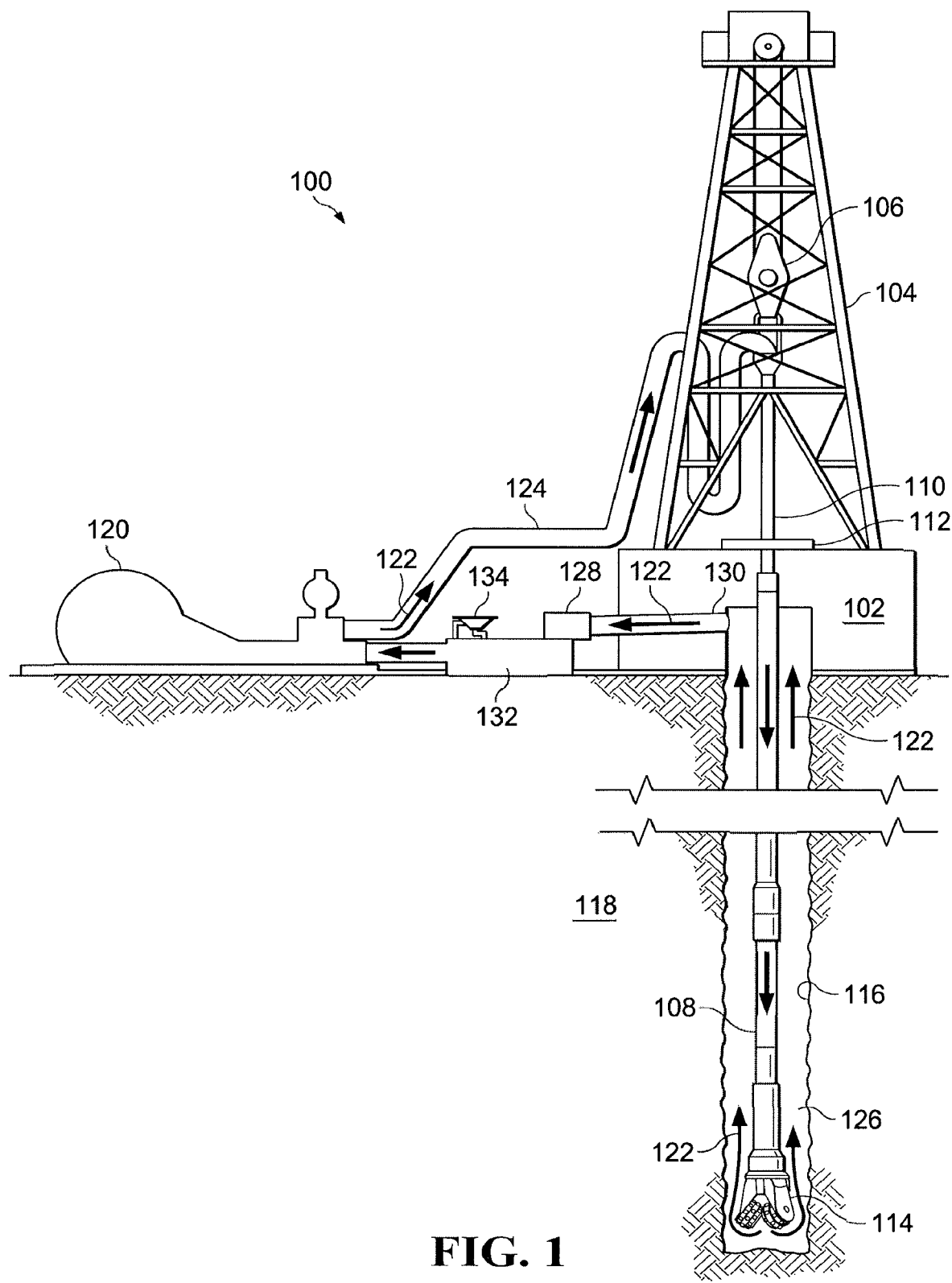
FIG. 1 is a diagram illustrating an example of a wellbore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to fiber additives that may be useful as lost circulation materials in mitigating fluid loss and/or as diverting agents in subterranean treatment fluids such as drilling fluids.

In order to overcome problems associated with lost circulation, lost-circulation materials ("LCM") or fluid loss additives may be included in a wellbore fluid. LCMs may be swellable or non-swellable, granular-shaped or other geometric-shaped substances. As the wellbore fluid is placed into the well, the LCM may eliminate or lessen the amount of liquid or total fluid entering the subterranean formation. For example, the individual components of the LCM may build upon each other and form a bridge over highly-permeable areas of the formation, such as natural fissures, fractures, and vugular zones, or induced fractures. The bridge may eliminate or reduce the amount of liquid base fluid entering the formation via the wellbore.

The present disclosure provides certain fiber additives for use as LCMs, fluid loss control agents, bridging agents, and/or diverting agents. The fiber additives may each include a fiber and calcium carbonate disposed on at least a portion of the outer surface of the fiber. The fiber additives of the present disclosure may be mixed with other components (e.g., a base fluid, other fluid loss additives or diverting agents, other additives, etc.) to form a treatment fluid that is then introduced into at least a portion of a subterranean formation to perform one or more operations therein.

The calcium carbonate crystals disposed (e.g., grown) on the fibers may alter the physical properties of the fibers and thus enhance the efficiency of using the fibers as LCMs. For example, the calcium carbonate on the fibers according to the present disclosure may enhance the viscosity and/or gel strength of the wellbore fluid having the fiber additives. By growing calcium carbonate on the surface of fibers, it is possible to control the hydrophilicity of the resulting fiber additives by varying the coverage as well as morphology of the calcium carbonate. Further treatments may be performed on the fibers to modify the calcium carbonate hydrophilicity. Such treatments may include, for example, acidizing the fibers using a static acid. The use of calcium carbonate on fibers according to the present disclosure may improve the dispersity and compatibility of the fiber additives in drilling fluids for better application as LCMs.

Among the many potential advantages to the methods and compositions of the present disclosure, only some of which are alluded to herein, the additives, methods, compositions, and systems of the present disclosure may provide improved sealing in pore throats or other areas of the formation, inter alia, because the fiber additives disclosed herein are more compatible with and/or dispersible in the base fluid than certain conventional fiber additives known in the art. As a result, smaller amounts of the fiber additives of the present disclosure may provide similar levels of fluid loss control as compared to conventional fiber LCMs. The disclosed fiber additives may act together to form a fiber network (or mesh)

across larger pore throats or other areas of the formation that captures additional particles as well. The calcium carbonate added to the outer surface of the fibers may affect the fiber-to-fiber interactions such that the fibers are less likely to become aligned with each other when shear stresses act on the treatment fluid. As a result, the fiber additives may provide and maintain their configuration as a network plugging one or more fluid loss zones of the subterranean formation.

The calcium carbonate crystals on the fibers modifies certain flow properties of the fiber additive suspension such as density and/or viscosity to enable better application as LCMs. Specifically, calcium carbonate on the fibers increases the density of the fibers, making them easier to mix with a base fluid (as they are less likely to float) to form the wellbore fluid. This increase in fiber density has been verified with sedimentation experiments using a Turbiscan® device, where the calcium carbonate coated fibers settle down in a base fluid faster than untreated fibers under the same conditions. The presence of calcium carbonate on the fiber also enhances the fiber's plug-in capability due to increases in the fiber stiffness and strength due to the increased density, and also may change the rheology of the fiber laden fluid. With the added calcium carbonate crystals, the fibers are no longer smooth. The less smooth surfaces of the fibers change the fiber to fiber interactions to increase the viscosity of the resulting wellbore fluid.

In certain embodiments, the lost circulation material of the present disclosure may include a fiber. As used herein, the term "fiber" refers to a solid that is characterized by having a relatively high aspect ratio of length to diameter. For example, a fiber may have an aspect ratio of length to diameter of greater than about 2:1, or alternatively from about 2:1 to about 5,000:1, or alternatively from about 2:1 to about 1,000:1. The fiber may be natural, synthetic, biodegradable, and/or biocompatible. Examples of natural (or organic) fibers include, but are not limited to: fibers derived from an animal source such as silk, horse hair, or wool; fibers of cellulose including viscose cellulosic fibers, oil coated cellulosic fibers, and fibers derived from a plant product like paper fibers. Examples of synthetic fibers include, but are not limited to, polymers or copolymers composed of polypropylene, polyurethane, polyaramid, polyester, polyacrylonitrile, polyvinyl alcohol, and any copolymers, derivatives or combinations thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound. Examples of biodegradable fibers include, but are not limited to, fibers composed of modified cellulose, chitosan, soya, modified chitosan, polycaprolactone, polylactic acid, poly(3-hydroxybutyrate), polyhydroxy-alkanoates, polyglycolic acid (PGA), polylactic acid (PLA), polyorthoesters, polycarbonates, polyaspartic acid, polyphosphoesters, and any copolymers, derivatives or combinations thereof. Examples of other suitable fibers include carbon fibers and melt-processed inorganic fibers including basalt fibers, wollastonite fibers, non-amorphous metallic fibers, ceramic fibers, and glass fibers. The fiber can also be a composite fiber made from any combination of the preceding materials.

There can also be a mixture of fibers wherein the fibers are composed of different substances. A commercially-available example of suitable fibers is BAROLIFT® fibers (sweeping agent, available from Halliburton Energy Services, Inc.), which is a synthetic fiber.

The fiber can have a fiber length and a fiber diameter. In certain embodiments, the fiber may have a length in the range of about 0.5 millimeters (mm) to about 25 mm, or alternatively about 1 mm to about 15 mm, or alternatively about 2 mm to about 10 mm. The fiber length may be specifically chosen based on an expected size of fractures or loss zones to which the fibers will be provided. At the time the fibers are initially formed or selected for use, the fibers may be much longer; the fibers may be cut to a desired length before deployment within a wellbore environment. In certain embodiments, the fiber may have a diameter in the range of about 0.5 microns ($\mu$m) to about 20 $\mu$m, or alternatively about 1 $\mu$m to about 15 $\mu$m, or alternatively about 5 $\mu$m to about 10 $\mu$m. Such fiber dimensions may be measured using the standard projection microscope method. In certain embodiments, the fiber additives may include fibrillated fibers. The term "fibrillated fibers" refers to fibers bearing sliver-like fibrils along the length of the fiber. The fibrils extend from the fiber, which may be referred to as the "core fiber," and have a diameter significantly less than that of the core fiber from which the fibrils extend.

The calcium carbonate disposed on the outer surface of the fiber may be distributed in any fashion or form (e.g., as a coating or film, or as distinct clusters or small masses of crystals), and may be disposed on the outer surface of the fiber in any amount. In some embodiments, the outer surface of the fiber may be at least partially coated with calcium carbonate, or may be substantially entirely or entirely coated with calcium carbonate. The calcium carbonate may be placed on the fiber by any suitable means of deposition. For example, in some embodiments, the calcium carbonate may be deposited on the fiber via various precipitation techniques. In certain such techniques, an aqueous solution of a calcium source (such as, e.g., a calcium chloride solution) and a carbonate source (such as, e.g., a sodium carbonate solution) may be mixed into a suspension of the base fibers to precipitate calcium carbonate on the fibers. This deposition method may create a variable layer of calcium carbonate crystals on the fibers. In other embodiments, calcium oxide (CaO, or lime) is hydrated into calcium hydroxide ($Ca(OH)_2$, or slaked lime), followed by carbonation of the hydroxide in the presence of a suspension of the fibers. This deposition method, also known as a $CO_2$ precipitation of calcium carbonate (PCC) process, may create a relatively uniform, smooth coating of a thin layer of calcium carbonate on the fibers.

Variations in the process of depositing calcium carbonate on the fibers may yield different sizes and/or morphologies of calcium carbonate crystals, as well as different coverages or concentrations of the calcium carbonate coating on the fibers. For example, the time and rate of precipitation of the calcium carbonate may be adjusted to provide a concentration or coverage of calcium carbonate within a desired range. The two calcium carbonate deposition methods discussed above may result in different crystal morphologies of the resultant precipitated calcium carbonate. Variations in temperature during the deposition process may change the morphology of the calcium carbonate deposited on the fibers.

When the calcium carbonate is provided as a coating or layer on the outer surface of the fiber, such coating or film may have any suitable thickness, which may be uniform or variable across the outer surface of the fiber. For example, in some embodiments, the thickness of the calcium carbonate crystals may range from about 0.01 µm to about 10 µm, or alternatively about 0.05 µm to about 5 µm, or alternatively about 0.1 µm to about 1 µm, or alternatively about 0.2 µm to about 0.5 µm. Such crystal dimensions may be measured using the ASTM F1877 standard practice for characterization of particles. In embodiments where the calcium carbonate has a rod-shaped morphology (aragonite crystals), the thickness of the calcium carbonate crystals may be within any of the ranges listed above, while the length of the calcium carbonate crystals may range from about 1 µm to about 25 µm, or alternatively about 5 µm to about 20 µm, or alternatively about 10 µm to about 15 µm. Such crystal dimensions may be measured using the ASTM F1877 standard practice for characterization of particles. The calcium carbonate coating may have any suitable concentration within the resulting fiber additive to be used as lost circulation material. In some embodiments, the calcium carbonate may be present in the resulting fiber additive in an amount from about 1% to about 90% by weight of the fiber additive, from about 1% to about 75% by weight of the fiber additive, from about 1% to about 50% by weight of the fiber additive, or from about 10% to about 35% by weight of the fiber additive. A person of skill in the art with the benefit of this disclosure will recognize the appropriate crystal size (thickness and/or length) of the calcium carbonate crystals and appropriate concentration of the calcium carbonate suitable for a particular embodiment based on, for example, the desired density of the fiber additives, the desired viscosity of the resulting treatment fluid, and the like.

The fiber additives of the present disclosure may include fibers of any size that is appropriate for use as a lost circulation material, a diverting agent, a bridging agent, a sweeping agent, a suspending agent, a filtration agent, or other fluid loss additive. In some embodiments, the fiber additives of the present disclosure may include fibers of substantially different lengths (e.g., a bimodal or multimodal length distribution), among other reasons, to more effectively form a fiber network that will prevent a base fluid of the treatment fluid from penetrating into a subterranean formation.

In certain embodiments, lost circulation materials formed by the disclosed fiber additives may have a bulk density of from about 0.05 grams per cubic centimeter (g/cc) to about 1 g/cc, alternatively from about 0.1 g/cc to about 0.5 g/cc, or alternatively from about 0.1 g/cc to about 0.2 g/cc, as measured using the ASTM D6683 standard test method for measuring bulk density.

The treatment fluids used in the methods and systems of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons (e.g., diesel, mineral oil, or linear olefins and paraffins), organic liquids, and the like. In certain embodiments, the treatment fluids may include a mixture of one or more fluids and/or gases, including but not limited to emulsions (e.g., invert emulsions), foams, and the like.

In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In an embodiment, the amount of base fluid present in the treatment fluid may be from about 50 to about 95 percent by weight (wt. %) of the treatment fluid, alternatively, from about 70 wt. % to about 90 wt. %, alternatively, from about 70 wt. % to about 85 wt. %.

In some embodiments, the volume of a treatment fluid including a fiber additive lost circulation material that is introduced into a wellbore may depend, at least in part, on the bulk density of the lost circulation material. For example, the volume of a lost circulation fluid pill including a treatment fluid including a lost circulation material may depend, at least in part, on wellbore pressure and the bulk density of the lost circulation material. The amount of lost circulation material may be added to the drilling on a mass basis.

The treatment fluid includes the disclosed fiber additives, which include a plurality of fibers with calcium carbonate thereon. In certain embodiments, the fiber additives may include other ingredients as well. In certain embodiments, the fiber additives may consist essentially of, or consist of, the plurality of fibers with calcium carbonate thereon. The fiber additives may be provided in dry form or in a liquid suspension.

The fiber additives of the present disclosure may be included in a treatment fluid of the present disclosure in any amount suitable to form a fiber network that provides the desired amount of lost circulation prevention, fluid loss prevention, and/or diversion, either alone or in combination with other fluid loss additives or diverting agents in the fluid. In some embodiments, the calcium carbonate coated fiber additives of the present disclosure may be included in a treatment fluid in an amount of from about 1 pound per barrel of fluid ("lbs/bbl") to about 30 lbs/bbl, or alternatively, from about 5 lbs/bbl to about 20 lbs/bbl, or alternatively, from about 10 lbs/bbl to about 15 lbs/bbl. This may be measured using a mud retort test in accordance with API recommended practice RP 13B-1. The amount of calcium carbonate coated fiber additives to include in a treatment fluid according to the present disclosure may vary depending on certain factors that will be apparent to those of skill in the art with the benefit of this disclosure, including but not limited to the severity of seepage losses occurring through the formation, porosity of the formation in which the treatment fluid will be used, the presence of other fluid loss additives or diverting agents in the fluid, pumpability limits, and the like. In some embodiments, the amounts/concentrations of the fiber additives of the present disclosure used may be less than the amounts/concentrations of conventional fiber lost circulation materials that would otherwise be necessary to provide the desired amount of lost circulation control.

In certain embodiments, the treatment fluids used in the methods and systems of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

In certain embodiments, the treatment fluids of the present disclosure may include additional lost circulation materials or bridging agents. In certain embodiments, additional lost circulation materials may include, but are not limited to, BARACARB® particulates (ground marble, available from Halliburton Energy Services, Inc.) including BARACARB® 5, BARACARB® 25, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof.

In certain embodiments, the treatment fluids and lost circulation materials of the present disclosure may be effective over a range of pH levels. For example, in certain embodiments, the treatment fluids may provide effective loss zone treatment from a pH of about 7 to about 12. Additionally, the treatment fluids of the present disclosure may be suitable for a variety of subterranean formations, including, but not limited to shale formations and carbonate formations.

In some embodiments, the treatment fluids of the present disclosure may have a density of from about 0.5 grams per cubic centimeter (g/cc) to about 3.0 g/cc, alternatively from about 0.8 g/cc to about 2.5 g/cc, alternatively from about 1.0 g/cc to about 2.0 g/cc, as measured using the ASTM D4380 standard test method for measuring density of a slurry via a mud balance.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the fiber additives of the present disclosure and/or other components of the treatment fluid may be metered directly into a base treatment fluid to form a treatment fluid. In certain embodiments, the base fluid may be mixed with the fiber additives of the present disclosure and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

In certain embodiments, the treatment fluid may be introduced into at least a portion of the subterranean formation with the base fibers of the fiber additives, followed by the precipitation of calcium carbonate on the surface of the base fibers in situ. The term "base fibers" refers to the fibers in their uncoated state, i.e., before calcium carbonate is deposited on the fibers. The base fibers may be initially mixed into the treatment fluid and introduced downhole and into at least a portion of the subterranean formation. Then, additional fluids may be introduced downhole to cause the growth of calcium carbonate on the base fibers in the subterranean formation. For example, the additional fluids may include a solution containing metal oxides, followed by an injection of $CO_2$ downhole to precipitate calcium carbonate on the fibers. In other instances, the additional fluids may include an aqueous solution of a calcium source and a carbonate source that cause calcium carbonate crystals to form on the base fibers. Growing the calcium carbonate on the fibers in situ (as opposed to introducing the fiber additives with the calcium carbonate coating directly into the wellbore) may enable the base fibers to be deposited in fractures in a subterranean formation so that later calcium carbonate growth on the fibers increases the fracture stress.

The present disclosure in some embodiments provides methods for using the treatment fluids to carry out a variety of subterranean treatments, including but not limited to, drilling operations, hydraulic fracturing treatments, and acidizing treatments. In some embodiments, the treatment fluids of the present disclosure may be used as a drilling fluid in drilling at least a portion of a wellbore to penetrate at least a portion of a subterranean formation. In certain embodiments, a treatment fluid may be introduced into a subterranean formation. In certain embodiments, the treatment fluid may be introduced into a wellbore that penetrates a subterranean formation. In some embodiments, the methods of the present disclosure may include introducing at least a portion of the treatment fluid within a loss zone or other flowpath through which the flow of fluids may be desirably reduced or ceased. In some embodiments, the treatment fluid may be introduced to the wellbore to prevent the loss of aqueous or non-aqueous fluids into loss zones such as voids, vugular zones, perforations, and natural or induced fractures.

In some embodiments, the fiber additives of the present disclosure may be incorporated into a drilling fluid that is used in drilling at least a portion of a wellbore to penetrate at least a portion of the subterranean formation. As the drilling fluid is circulated in the wellbore during drilling, the fiber additives of the present disclosure (either alone or in combination with particulate additives) may form one or more fiber networks that at least partially obstruct spaces in the wellbore walls. The fiber additives may also provide enhanced cuttings transport in the circulated drilling fluid. In other embodiments, the fiber additives of the present disclosure may be incorporated into a relatively small volume of fluid (e.g., about 200 bbl or less) such as a drilling fluid or a viscosified gel that is introduced into a portion of a subterranean formation, e.g., a treatment pill such as a lost circulation pill, to mitigate or prevent the loss of fluid into a specific region of the formation (e.g., loss zones). In these embodiments, the fluid carrying the fiber additives of the present disclosure may be pumped to the specific region of interest, and the fiber additives of the present disclosure may be deposited in that region to form a fiber network that can at least partially close or seal off that region of the formation and divert the flow of fluids away from that region.

After the fiber additives of the present disclosure have performed their function in reducing fluid loss and/or diverting fluids, in some embodiments, they may remain in the formation or may be removed from the formation through any suitable means. In some embodiments, the calcium carbonate portions of the fiber additives of the present disclosure may be dissolved using one or more acids. For example, an acidic solution may be introduced into the portion of the subterranean formation where the additives of the present disclosure have been placed. After dissolution of the calcium carbonate, in some embodiments, any remaining portions of the base fibers may be carried out of the formation, for example, with treatment fluids that are flowed back out of the formation, or the fibers may degrade in the formation over time. In certain embodiments, introduction of an acidic solution into the portion of the subterranean formation where the fiber additives have been placed may also dissolve the base fibers, particularly if the fibers are made from organic material, e.g., silk, cotton, paper, or animal hair.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled, and the treatment fluid may be circulated in the wellbore during, before, or after the drilling. In some embodiments, the treatment fluid may be introduced at a pressure sufficient to create or enhance one or more fractures within the subterranean formation (e.g., hydraulic fracturing).

The fiber additives, fluids, and methods of the present disclosure may directly or indirectly affect one or more components or pieces of equipment associated with the preparation, delivery, recapture, recycling, reuse, and/or disposal of the compositions of the present disclosure. For example, the fiber additives, fluids, and methods may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the compositions of the present disclosure. The fiber additives, fluids, and methods of the present disclosure may also directly or indirectly affect any transport or delivery equipment used to convey the fluid to a well site or downhole such as, for example, any transport vessels, conduits, pipelines, trucks, tubulars, and/or pipes used to compositionally move fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, and/or combinations thereof, and the like. For example, and with reference to FIG. 1, the disclosed additives and/or fluids may directly or indirectly affect one or more components or pieces of equipment associated with an example of a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed fiber additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed fiber additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed fiber additives may be stored, reconditioned, and/or regulated until added to the drilling fluid 122.

As mentioned above, the disclosed fluids and/or fiber additives may directly or indirectly affect the components and equipment of the drilling assembly 100. For example, the disclosed fluids and/or fiber additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, and the like. The fluid processing unit(s) 128 may further include one or more sensors, gauges, pumps, compressors, and the like used to store, monitor, regulate, and/or recondition the disclosed fluids and/or fiber additives.

The disclosed fluids and/or fiber additives may directly or indirectly affect the pump 120, which representatively includes any conduits, pipelines, trucks, tubulars, and/or pipes used to fluidically convey the fluids and/or fiber additives downhole, any pumps, compressors, or motors (e.g., topside or downhole) used to drive the fluids and/or fiber additives into motion, any valves or related joints used to regulate the pressure or flow rate of the fluids and/or fiber additives, and any sensors (i.e., pressure, temperature, flow rate, etc.), gauges, and/or combinations thereof, and the like. The disclosed fluids and/or fiber additives may also directly or indirectly affect the mixing hopper 134 and the retention pit 132 and their assorted variations.

The disclosed fluids and/or fiber additives may also directly or indirectly affect the various downhole equipment and tools that may come into contact with the fluids and/or fiber additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids and/or fiber additives may also directly or indirectly affect any downhole heat exchangers, valves and corresponding actuation devices, tool seals, packers and other wellbore isolation devices or components, and the like associated with the wellbore 116. The disclosed fluids and/or fiber additives may also directly or indirectly affect the drill bit 114, which may include, but is not limited to, roller cone bits, PDC bits, natural diamond bits, hole openers, reamers, coring bits, etc.

While not specifically illustrated herein, the disclosed fluids and/or fiber additives may also directly or indirectly affect any transport or delivery equipment used to convey the fluids and/or fiber additives to the drilling assembly 100 such as, for example, any transport vessels, conduits, pipelines, trucks, tubulars, and/or pipes used to fluidically move the fluids and/or fiber additives from one location to another, any pumps, compressors, or motors used to drive the fluids and/or fiber additives into motion, any valves or related joints used to regulate the pressure or flow rate of the fluids and/or fiber additives, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples use a series of fibers and calcium carbonate deposition processes to form fiber additives for use as lost circulation materials.

Example 1

In this example, calcium carbonate crystallization ($CaCO_3$) is used to deposit calcium carbonate on synthetic fibers. Calcium carbonate crystals were formed by mixing a $CaCl_2$) solution and a $NaCO_3$ solution and adding the mixture to a suspension of BAROLIFT® fibers. The resulting precipitated calcium carbonate on the fibers was in the form of discrete calcite crystals that were sparsely distributed about the outer surface of the fibers.

Figure 2:
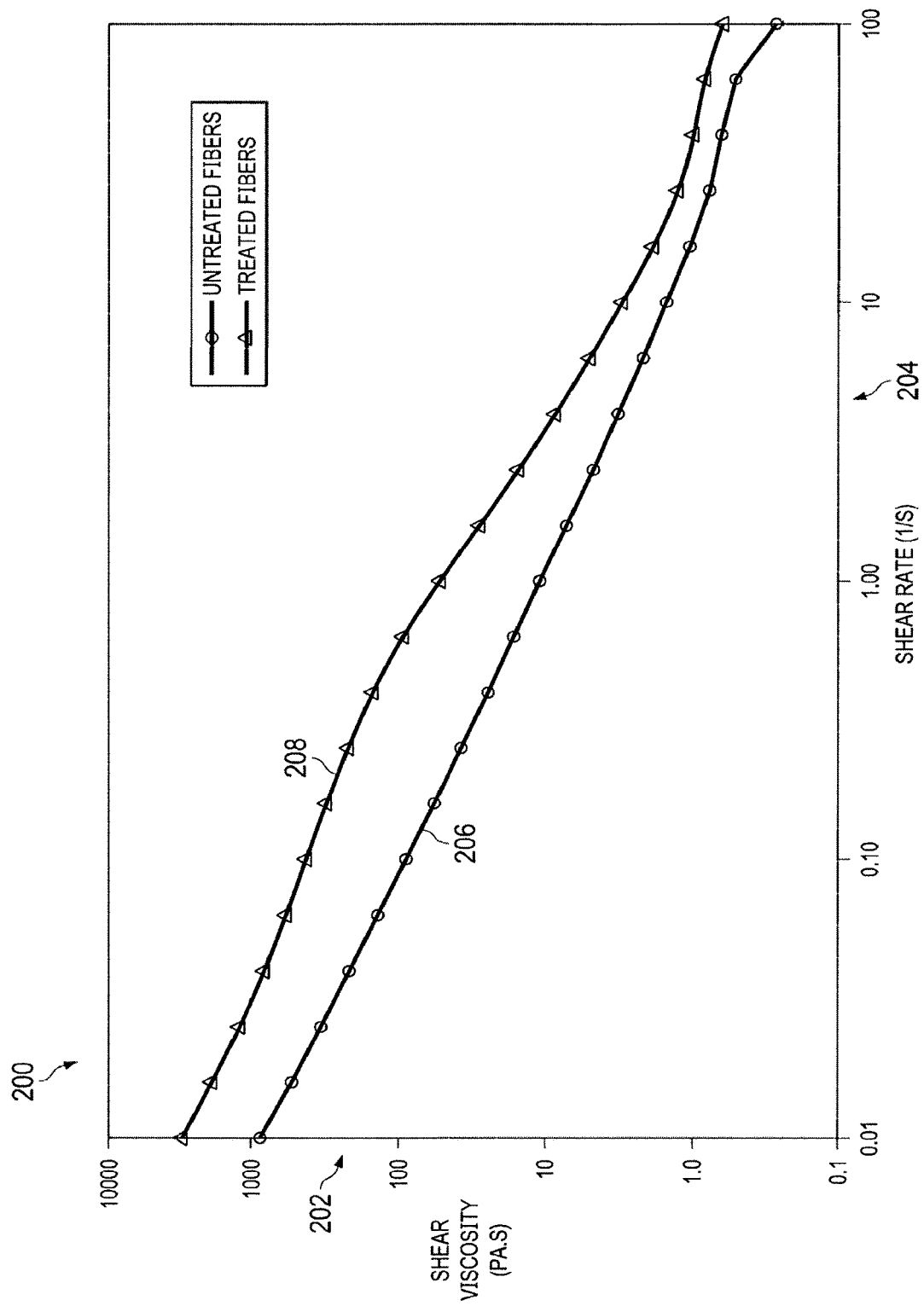
FIG. 2 is a plot illustrating shear viscosity taken as a function of shear rate for treated and untreated fibers, in accordance with certain embodiments of the present disclosure.

The shear thinning behavior of the resulting fiber additives was tested against that of untreated BAROLIFT® fibers. Both types of fibers were added to BARAZAN® D PLUS™ (viscosifier/suspension agent, available from Halliburton Energy Services, Inc.) in a concentration of 1.2 wt. %, and the shear viscosity for each solution was tested at different shear rates. The viscosity profile was obtained using a coaxial cylinder geometry (bob-cup) on an MCR501 rheometer (available from Anton Paar). FIG. 2 is a plot 200 illustrating the shear viscosity 202 in pascal seconds (Pa·s) of each of the tested fluids taken as a function of shear rate (1/seconds) 204. A first trace 206 represents the measurements taken for the solution with untreated fibers, while a second trace 208 represents the measurements taken for the solution with the treated fibers (fibers with calcium carbonate grown thereon). As illustrated, the shear viscosity for the treated fibers 208 is higher than that for the untreated fibers 206 across a wide range of shear rates. These results indicate that the fiber additives with calcium carbonate coated thereon experience increased interactions between the fibers, thereby improving the shear thinning behavior of the suspension by preventing fiber alignment in shear.

Example 2

In this example, calcium carbonate crystallization ($CaCO_3$) is used to deposit calcium carbonate on synthetic fibers after an acid treatment is performed on the fibers. The acid treatment increases the population of calcium carbonate crystals formed on the outer surface of the fibers. A suspension of BAROLIFT® fibers was treated with 1M NaOH solution for 2 hours. Then, calcium carbonate crystals were formed on the fiber surface by mixing a $CaCl_2$ solution and a $NaCO_3$ solution and adding the mixture to the fibers. The resulting precipitated calcium carbonate on the fibers was in the form of discrete calcite crystals that were more concentrated on the outer surface of the fibers, as compared to the fiber additives of Example 1.

Example 3

In this example, calcium carbonate crystallization ($CaCO_3$) is used to deposit calcium carbonate on organic fibers. Calcium carbonate crystals were formed by mixing a $CaCl_2$ solution and a $NaCO_3$ solution and adding the mixture to a suspension of silk fibers, without any additional acid treatment. The resulting precipitated calcium carbonate on the fibers was more concentrated on the outer surface of the fibers, as compared to the fiber additives of both Examples 1 and 2.

Example 4

In this example, C02-based precipitation of calcium carbonate (PCC) is used to deposit calcium carbonate on synthetic fibers. Calcium carbonate crystals were formed by adding $Ca(OH)_2$ to a suspension of BAROLIFT® fibers and flowing $CO_2$ through the mixture. The resulting precipitated calcium carbonate on the fibers was in the form of a relatively uniform coating of smaller crystals that were more evenly distributed about the fibers and having a better overall coverage of the fibers than any of the above Examples 1, 2, and 3.

An embodiment of the present disclosure is a method including: providing a treatment fluid that includes a base fluid and a fiber additive that includes: a fiber and calcium carbonate disposed on at least a portion of an outer surface of the fiber; and introducing the treatment fluid into a wellbore penetrating at least a portion of a subterranean formation including a loss zone.

In one or more embodiments described in the preceding paragraph, the method further includes at least partially plugging the loss zone by forming a fiber network across the loss zone via the fiber additive. In one or more embodiments described above, the fiber is an organic fiber. In one or more embodiments described above, the fiber is a synthetic fiber including a polymer. In one or more embodiments described above, the fiber has an aspect ratio of length to diameter of from about 2:1 to about 5,000:1. In one or more embodiments described above, the calcium carbonate has a thickness of about 0.01 µm to about 10 µm. In one or more embodiments described above, the calcium carbonate includes aragonite crystals having a length of about 1 µm to about 25 µm. In one or more embodiments described above, the fiber additive has a bulk density of about 0.05 g/cc to about 1 g/cc. In one or more embodiments described above, a plurality of fiber additives comprising the fiber additive are present in the treatment fluid in a concentration of about 1 lb/bbl to about 30 lbs/bbl. In one or more embodiments described above, the treatment fluid is a treatment pill having a volume of about 200 bbl or less.

Another embodiment of the present disclosure is a method including: providing a treatment fluid that includes a base fluid and a plurality of fibers; introducing the treatment fluid into a wellbore penetrating at least a portion of a subterranean formation; and precipitating calcium carbonate on at least a portion of an outer surface of each of the plurality of fibers when the fibers are in the wellbore, the subterranean formation, or both.

In one or more embodiments described in the preceding paragraph, growing the calcium carbonate includes: introducing additional fluids into the wellbore penetrating at least the portion of the subterranean formation; and precipitating the calcium carbonate on at least a portion of the outer surface of each of the fibers upon mixing the additional fluids with the plurality of fibers. In one or more embodiments described above, the method further includes: allowing the plurality of fibers to settle in one or more fractures in the subterranean formation; and upon growing the calcium carbonate on at least a portion of the outer surface of each of the plurality of fibers, increasing a fracture stress on the one or more fractures. In one or more embodiments described above, the method further includes at least partially plugging a loss zone in the subterranean formation by forming a fiber network across the loss zone via the fibers with calcium carbonate thereon.

Another embodiment of the present disclosure is a composition including: a base fluid and a plurality of fiber additives, wherein each fiber additive includes a fiber and calcium carbonate disposed on at least a portion of an outer surface of the fiber.

In one or more embodiments described in the preceding paragraph, the fiber is an organic fiber. In one or more embodiments described above, the fiber is a synthetic fiber including a polymer. In one or more embodiments described above, the fiber has a length of about 0.5 mm to about 25 mm, and a diameter of about 0.5 µm to about 20 µm. In one or more embodiments described above, the fiber lost circulation materials include a bulk density of about 0.05 g/cc to about 1 g/cc. In one or more embodiments described above, the fiber lost circulation materials are in the treatment fluid in a concentration of about 1 lb/bbl to about 30 lbs/bbl.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid that comprises a base fluid and a fiber additive that comprises:
   a fiber, wherein the fiber has a length of about 0.5 mm to about 25 mm;
   calcium carbonate disposed on at least a portion of an outer surface of the fiber;
   introducing the treatment fluid into a wellbore penetrating at least a portion of a subterranean formation comprising a loss zone; and
   at least partially plugging the loss zone by forming a fiber network across the loss zone via the fiber additive.

2. The method of claim 1, wherein the fiber is an organic fiber.

3. The method of claim 1, wherein the fiber is a synthetic fiber comprising a polymer.

4. The method of claim 1, wherein the fiber has an aspect ratio of length to diameter of from about 2:1 to about 5,000:1.

5. The method of claim 1, wherein the fiber has a diameter of about 0.5 μm to about 20 μm.

6. The method of claim 1, wherein the calcium carbonate has a thickness of about 0.01 μm to about 10 μm.

7. The method of claim 1, wherein the calcium carbonate comprises aragonite crystals having a length of about 1 μm to about 25 μm.

8. The method of claim 1, wherein the fiber additive comprises a bulk density of about 0.05 g/cc to about 1 g/cc.

9. The method of claim 1, wherein a plurality of fiber additives comprising the fiber additive are present in the treatment fluid in a concentration of about 1 lb/bbl to about 30 lbs/bbl.

10. The method of claim 1, wherein the treatment fluid is a treatment pill having a volume of about 200 bbl or less.

11. A method comprising:
providing a treatment fluid that comprises a base fluid and a fiber additive that comprises:
a synthetic fiber comprising a polymer or copolymer selected from the group consisting of: polypropylene, polyurethane, polyaramid, polyester, polyacrylonitrile, polyvinyl alcohol, and any copolymers, derivatives or combinations thereof, wherein the synthetic fiber has a length of about 0.5 mm to about 25 mm; and
calcium carbonate disposed on at least a portion of an outer surface of the synthetic fiber;
introducing the treatment fluid into a wellbore penetrating at least a portion of a subterranean formation comprising a loss zone; and
at least partially plugging the loss zone by forming a fiber network across the loss zone via the fiber additive.

12. The method of claim 11, wherein the synthetic fiber has an aspect ratio of length to diameter of from about 2:1 to about 5,000:1.

13. The method of claim 11, wherein the synthetic fiber has a diameter of about 0.5 μm to about 20 μm.

14. A method comprising:
providing a treatment fluid that comprises a base fluid and a fiber additive that comprises:
a fiber, wherein the fiber has a length of about 0.5 mm to about 25 mm; and
calcium carbonate disposed on at least a portion of an outer surface of the fiber, wherein the calcium carbonate is present in an amount from about 10% to about 35% by weight of the fiber additive;
introducing the treatment fluid into a wellbore penetrating at least a portion of a subterranean formation comprising a loss zone; and
at least partially plugging the loss zone by forming a fiber network across the loss zone via the fiber additive.

15. The method of claim 14, wherein the fiber has an aspect ratio of length to diameter of from about 2:1 to about 5,000:1.

16. The method of claim 14, wherein the fiber has a diameter of about 0.5 μm to about 20 μm.

17. The method of claim 14, wherein the fiber includes a material selected from the group consisting of: carbon fiber, basalt fiber, wollastonite fiber, non-amorphous metallic fiber, ceramic fiber, glass fiber, or any combination thereof.

* * * * *